US012355259B2

(12) United States Patent
Chen

(10) Patent No.: US 12,355,259 B2
(45) Date of Patent: Jul. 8, 2025

(54) WIRELESS CHARGING DEVICE WITH NFC COMMUNICATION FOR MULTI-MODULE COORDINATION

(71) Applicants: INVENTEC (PUDONG) TECHNOLOGY CORPORATION, Shanghai (CN); INVENTEC CORPORATION, Taipei (TW)

(72) Inventor: Ting Kai Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 24 days.

(21) Appl. No.: 18/516,631

(22) Filed: Nov. 21, 2023

(65) Prior Publication Data
US 2025/0079888 A1    Mar. 6, 2025

(30) Foreign Application Priority Data

Aug. 30, 2023 (CN) .......................... 202311110517.1
Sep. 6, 2023 (CN) .......................... 202311146199.4

(51) Int. Cl.
| H02J 50/00 | (2016.01) |
| H02J 50/10 | (2016.01) |
| H02J 50/80 | (2016.01) |
| H02J 50/90 | (2016.01) |

(Continued)

(52) U.S. Cl.
CPC ............ *H02J 50/005* (2020.01); *H02J 50/10* (2016.02); *H02J 50/80* (2016.02); *H02J 50/90* (2016.02); *H04B 5/26* (2024.01); *H04B 5/79* (2024.01)

(58) Field of Classification Search
None
See application file for complete search history.

(56) References Cited

U.S. PATENT DOCUMENTS

| 10,594,368 B1 * | 3/2020 | Wurmfeld ................ H04B 5/26 |
| 11,121,590 B1 * | 9/2021 | Patel .................. G06K 7/10297 |
| 12,225,699 B2 * | 2/2025 | Yoon .................... H05K 9/0081 |

(Continued)

OTHER PUBLICATIONS

Vladimir Romanov, "Limit Switch Explained—What it is, How it works & How it is used in manufacturing" webpage available at https://www.solisplc.com/tutorials/limit-switch; available at least by Feb. 27, 2021 (Year: 2021).*

*Primary Examiner* — Adi Amrany
(74) *Attorney, Agent, or Firm* — Maschoff Brennan

(57) ABSTRACT

A wireless charging device includes a near-field communication chip, a plurality of charging modules, a plurality of infrared sensors, a switching component and a control module, wherein the control module is connected to the near-field communication chip, the plurality of charging modules, the plurality of infrared sensors and the switching component. The switching component is connected to the near-field communication chip and the plurality of charging modules. The plurality of infrared sensors are respectively disposed at the plurality of charging modules. The control module is configured to control the switching component to conduct the near-field communication chip and the near-field communication antenna of a target module among the plurality of charging modules according to a sensing signal of each of the plurality of infrared sensors.

16 Claims, 5 Drawing Sheets

(51) Int. Cl.
*H04B 5/26* (2024.01)
*H04B 5/79* (2024.01)

(56) References Cited

U.S. PATENT DOCUMENTS

2015/0318711 A1* 11/2015 Moon ................. H01Q 7/00
                                                                                 307/104
2019/0372625 A1* 12/2019 Ueno ................. H04B 5/73
2020/0021023 A1* 1/2020 Ueno ................. H01Q 1/2258

* cited by examiner

WIRELESS CHARGING DEVICE WITH NFC COMMUNICATION FOR MULTI-MODULE COORDINATION

CROSS-REFERENCE TO RELATED APPLICATIONS

This non-provisional application claims priority under 35 U.S.C. § 119(a) on Patent Application No(s). 202311146199.4 filed in China on Sep. 6, 2023, and on Patent Application No(s). 202311110517.1 filed in China on Aug. 30, 2023, the entire contents of which are hereby incorporated by reference.

BACKGROUND

1. Technical Field

This disclosure relates to a wireless charging device.

2. Related Art

The applications of near-field communication (NFC) in wireless charging mainly include NFC wireless charger position tracking, NFC wireless charger automatic switch, NFC wireless charging multi-purpose function, NFC wireless charger safety control, and NFC wireless charger interactive functions. In near-field communication applications, antennas are usually used as components for transmitting and receiving wireless signals. The configuration of the antenna should match the position and layout of its corresponding coil, as well as the communication performance and signal intensity itself. Therefore, most existing methods configure a near-field communication chip with a set of antenna and the corresponding coil.

Wireless charging devices usually need a near-field communication antenna and its corresponding coil. That is, a near-field wireless communication chip needs to be provided with a set of antenna and corresponding coil. Therefore, in order to achieve wireless charging for multiple devices at the same time, this approach requires multiple wireless charging modules containing antennas, each equipped with multiple near-field wireless communication chips. As a result, it may increase the cost of implementation and may also occupy more space on the printed circuit board.

SUMMARY

Accordingly, this disclosure provides a wireless charging device.

According to one or more embodiment of this disclosure, a wireless charging device includes a near-field communication chip, a plurality of charging modules, a plurality of infrared sensors, a switching component and a control module, wherein the control module is connected to the near-field communication chip, the plurality of charging modules, the plurality of infrared sensors and the switching component. The switching component is connected to the near-field communication chip and the plurality of charging modules. The plurality of infrared sensors are respectively disposed at the plurality of charging modules. The control module is configured to control the switching component to conduct the near-field communication chip and the near-field communication antenna of a target module among the plurality of charging modules according to a sensing signal of each of the plurality of infrared sensors.

According to one or more embodiment of this disclosure, a wireless charging device includes a near-field communication chip, a plurality of charging modules, a plurality of limit switches, a switching component and a control module, wherein the control module is connected to the near-field communication chip, the plurality of charging modules, the plurality of limit switches and the switching component. The switching component is connected to the near-field communication chip and the plurality of charging modules. The plurality of limit switches are respectively disposed at the plurality of charging modules. The control module is configured to control the switching component to conduct the near-field communication chip and the near-field communication antenna of a target module among the plurality of charging modules according to detection potential of each of the plurality of limit switches.

In view of the above description, the wireless charging device of the present disclosure may use the plurality of infrared sensors/limit switches disposed in the plurality of charging modules to determine whether there is an object placed on the plurality of charging modules, and use the switching component to conduct the near-field communication chip and the near-field communication antenna of the charging module on which the object is placed. Thus, compared to the wireless charging device that uses multiple near-field communication chips to conduct near-field communication antennas contained in multiple charging modules, the wireless charging device of the present disclosure may use one near-field communication chip to conduct the near-field communication antennas contained in respective one of the plurality of charging modules while maintaining the same function, thereby achieving cost reduction of near-field communication chips, layout optimization, and improving the accuracy of near-field communication determination.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
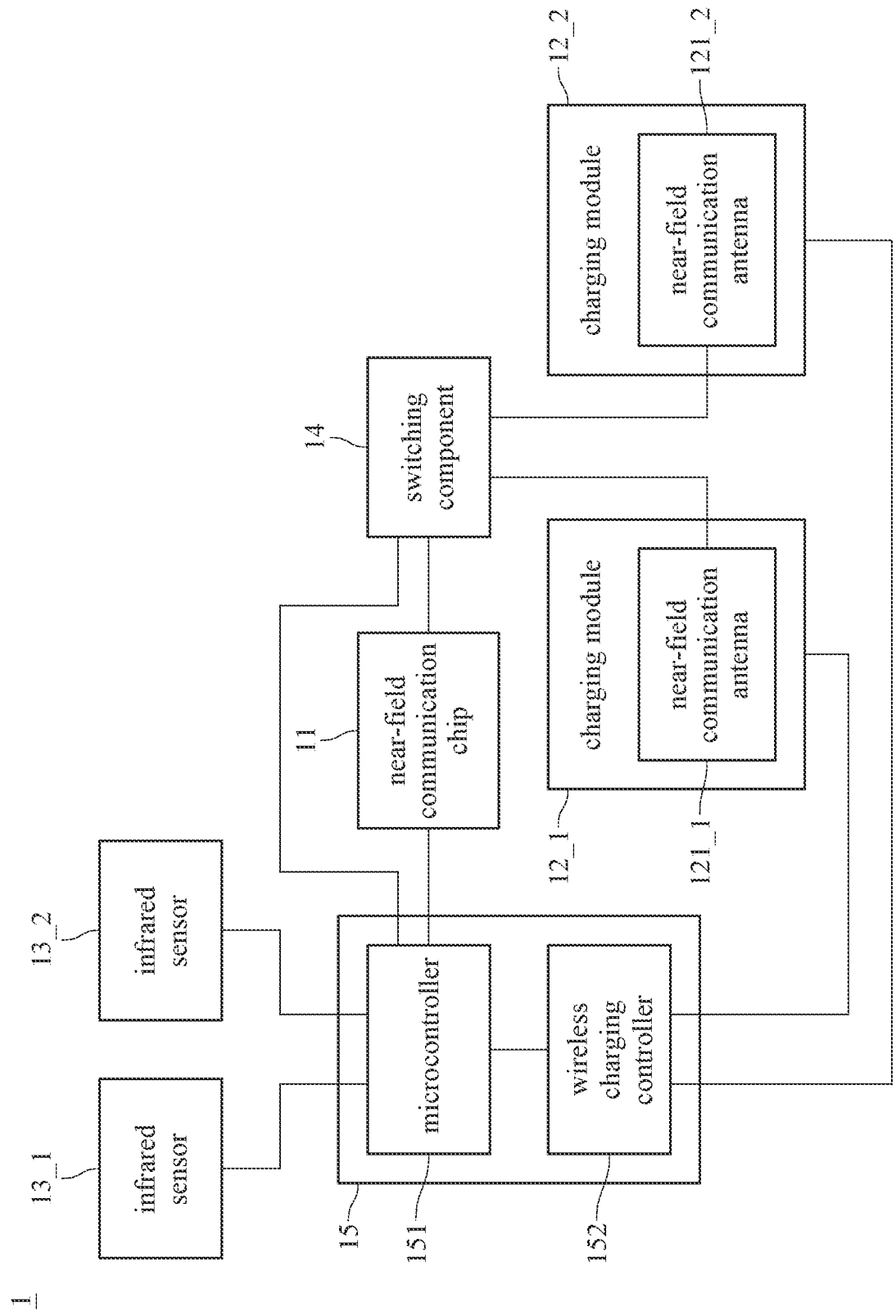
FIG. 1 is a functional block diagram of a wireless charging device according to an embodiment of the present disclosure.

Please refer to FIG. 1 which is a functional block diagram of a wireless charging device according to an embodiment of the present disclosure. As shown in FIG. 1, a wireless charging device 1 includes a near-field communication chip 11, charging modules 12_1 and 122, infrared sensors 13_1 and 13_2, a switching component 14 and a control module 15. The charging module 12_1 includes a near-field communication antenna 1211, and the charging module 12_2 includes a near-field communication antenna 121_2. The switching component 14 is connected to the near-field communication chip 11 and the charging modules 12_1 and 12_2. The control module 15 is connected to the near-field communication chip 11, the charging modules 12_1 and 12_2, the infrared sensors 13_1 and 13_2 and the switching component 14. Furthermore, the control module 15 may include a microcontroller 151 and a wireless charging controller 152. The microcontroller 151 may be connected to the near-field communication chip 11, the infrared sensors 13_1 and 13_2, the switching component 14 and the wireless charging controller 152. The wireless charging controller 152 may be connected to the charging modules 12_1 and 12_2.

The near-field communication chip 11 is configured to process signals which are based on near-field communication technology. The charging modules 12_1 and 12_2 can each be placed on an object to be charged to provide wireless charging and wireless communication functions for the object to be charged. Specifically, the charging modules 12_1 and 12_2 may be disposed in one or more bases, the one or more bases have multiple charging areas for placing multiple objects to be charged, and the locations of the charging modules 12_1 and 12_2 in the base respectively correspond to the multiple charging areas. The near-field communication chip 11 may be switched by the switching component 14 to transmit and receive signals based on the near-field communication technology through the near-field communication antenna 121_1 in the charging module 12_1 or the near-field communication antenna 121_2 in the charging module 12_2.

The infrared sensors 13_1 and 13_2 are respectively disposed at the charging modules 12_1 and 12_2 for sensing to generate signals indicating whether there are objects placed on the charging modules 12_1 and 12_2. Specifically, the infrared sensors 13_1 and 13_2 may be reflective photointerrupters including infrared light-emitting diodes, photoelectric crystals and two resistors. When an object is placed on the charging module 12_1, the infrared sensor 13_1 may generate a sensing signal with a preset potential; when an object is placed on the charging module 12_2, the infrared sensor 13_2 may generate a sensing signal with a preset potential. That is, the preset potential indicates that an object is placed on the charging module 12_1/12_2. The value of the preset potential may be set according to the material and structure of the charging modules 12_1 and 12_2 and the material of the applicable object to be charged, and is not limited by the present disclosure. Furthermore, at least one of the two resistors in the infrared sensors 13_1 and 132 may be a variable resistor. The resistance value of the variable resistor may be adjusted according to the material of the object to be charged, whereby the wireless charging device 1 may be applied to the object to be charged of various materials.

The switching component 14 is configured to be switched to conduct the near-field communication chip 11 and the near-field communication antenna 121_1 in the charging module 12_1 or to conduct the near-field communication chip 11 and the near-field communication antenna 121_2 in the charging module 12_2. For example, the switching component 14 may be a radio-frequency switching component providing a high-speed switching function.

The control module 15 is configured to control the switching component 14 to conduct the signal transmission path between the near-field communication chip 11 and the near-field communication antenna 121_1, or to conduct the signal transmission path between the near-field communication chip 11 and the near-field communication antenna 121_2, or to conduct the two above-mentioned signal transmission paths in a preset sequence, according to the sensing signals of the infrared sensors 13_1 and 13_2.

Specifically, when the infrared sensor 131 provided in the charging module 12_1 has a sensing signal with a preset potential, the control module 15 may control the switching component 14 to conduct the near-field communication chip 11 and the near-field communication antenna 121_1 of the charging module 12_1; when the infrared sensor 13_2 provided in the charging module 12_2 has a sensing signal with a preset potential, the control module 15 may control the switching component 14 to conduct the near-field communication chip 11 and the near-field communication antenna 121_2 of the charging module 12_2. In other words, the control module 15 may use one of the charging modules 12_1 and 12_2 that has the sensing signal with the preset potential as the target module to be conducted. Furthermore, the control module 15 may obtain the signal received by the near-field communication antenna 121_1 or 121_2 of the charging module 12_1 or 12_2 used as the target module through the near-field communication chip 11, and then selectively control the charging module 12_1 or 12_2 to output electrical power according to the signal. Furthermore, the control module 15 may confirm whether the received signal meets the preset charging standard, and when it is determined that the signal meets the preset charging standard, the control module 15 may control the target module to output electrical power.

In addition, when the sensing signals of the infrared sensors 13_1 and 13_2 both have the preset potential, the control module 15 may control the switching component 14 to conduct multiple signal transmission paths in a preset sequence. Taking the preset sequence of charging module 12_1 as first and the charging module 12_2 as second as an example, the control module 15 may control the switching component 14 to first conduct the charging module 121 equipped with the infrared sensor 13_1 with the near-field wireless communication chip 11 to obtain the signal received by the near-field communication antenna 121_1, then switch to conduct the charging module 122 equipped with the infrared sensor 13_2 to obtain the signal received by the near-field communication antenna 121_2, that is, the charging modules 12_1 and 12_2 are both target modules to be conducted. Specifically, when the sensing signals of the infrared sensors 13_1 and 13_2 both have the preset potential, it represents that the charging modules 12_1 and 12_2 where the infrared sensors 13_1 and 13_2 are disposed have objects placed on them, and the charging modules 12_1 and 12_2 are both target modules that may be controlled by the control module 15 to output electrical power.

Figure 2:
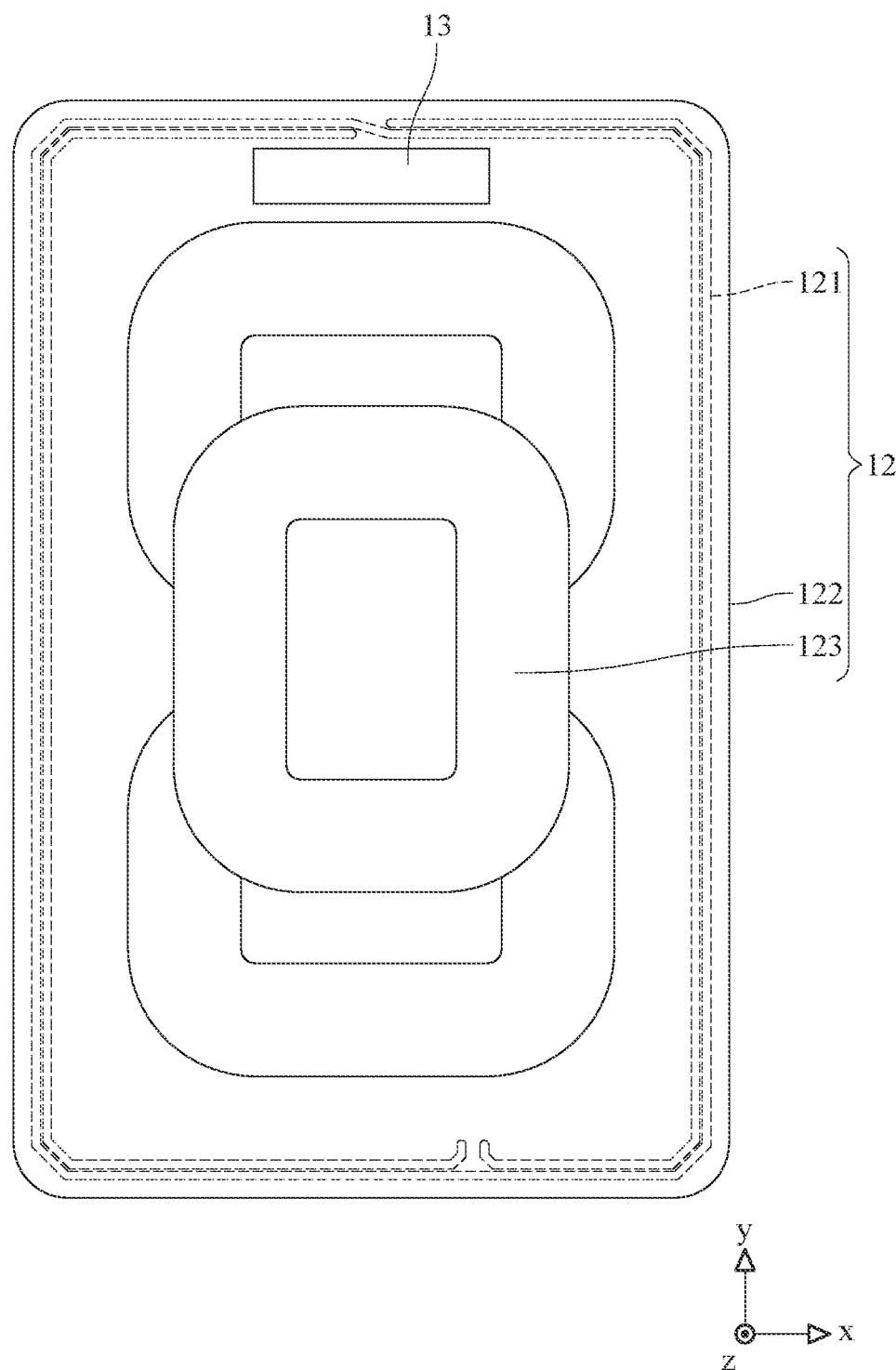
FIG. 2 is a schematic diagram of the arrangement relationship between the charging module and the infrared sensor of the wireless charging device according to an embodiment of the present disclosure.

Please refer to FIG. 2 along with FIG. 1, wherein FIG. 2 is a schematic diagram of the arrangement relationship between the charging module and the infrared sensor of the wireless charging device according to an embodiment of the present disclosure. The arrangement relationship between the charging module 12_1 and the infrared sensor 13_1 and the arrangement relationship between the charging module 12_2 and the infrared sensor 13_2 shown in FIG. 1 may be the same as the arrangement relationship between the charging module 12 and the infrared sensor 13 shown in FIG. 2.

As shown in FIG. 2, the charging module 12 may include a near-field communication antenna 121, a substrate 122 and a charging coil 123. The near-field communication antenna 121 and the charging coil 123 are disposed at the substrate 122, especially on opposite sides of the substrate 122. Specifically, the near-field communication antenna 121 may be disposed on the substrate 122 along a placement direction z, and a projection of the near-field communication antenna 121 along the placement direction z does not overlap the infrared sensor 13. The charging coil 123 may be disposed on the substrate 122 along the placement direction z, and a projection of the charging coil 123 along the placement direction z may not overlap the infrared sensor 13. In this way, the interference of the infrared sensor 13 to the near-field communication antenna 121 and/or the charging coil 123 may be reduced. It should be noted that FIG. 2 illustrates that the near-field communication antenna 121 includes two loops of circuits and the charging coil 123 includes three sets of coils, which is not intended to limit the present disclosure.

Figure 3:
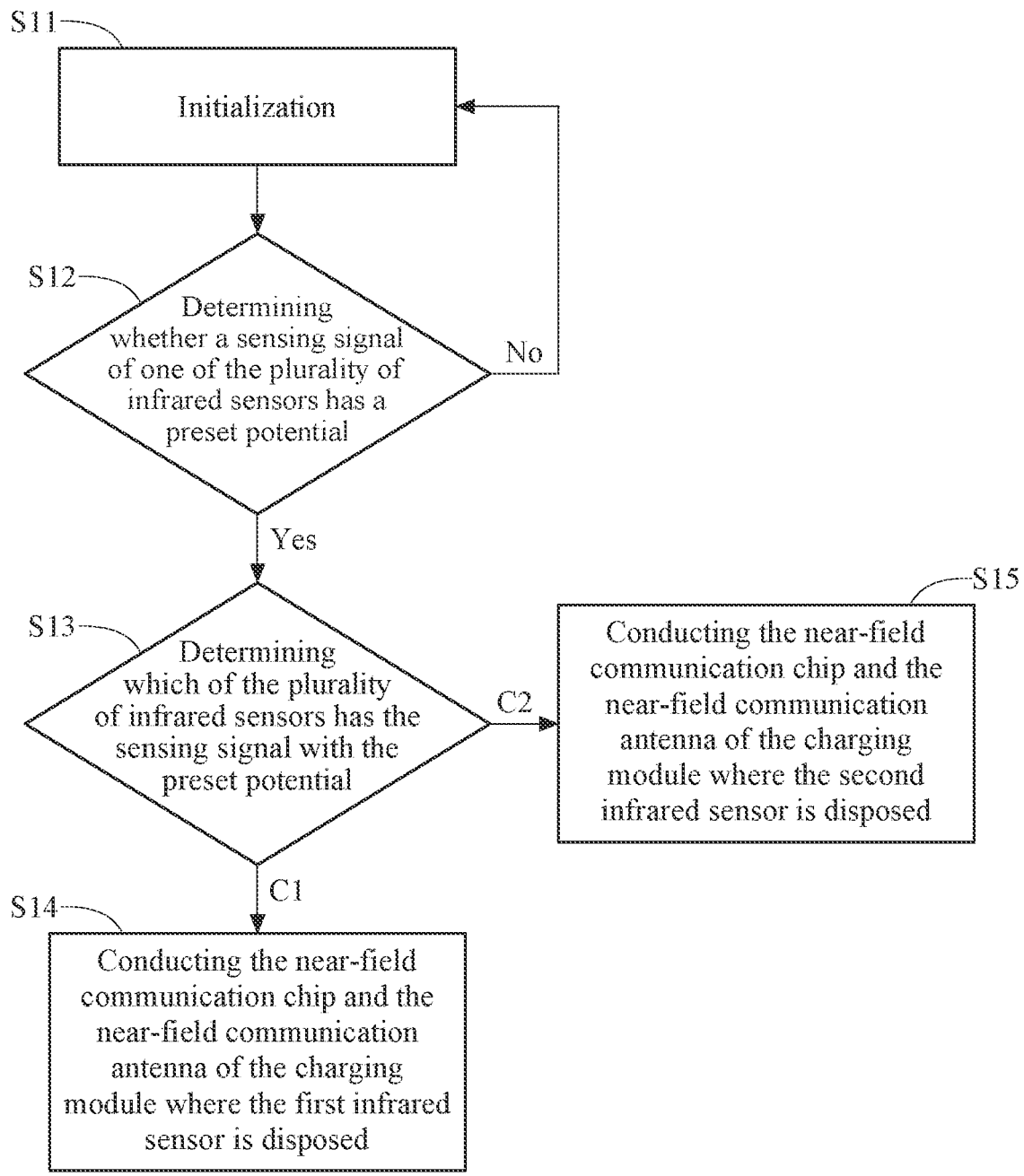
FIG. 3 is a flow chart of controlling the switching component of the wireless charging device according to an embodiment of the present disclosure.

Please refer to FIG. 3 along with FIG. 1, wherein FIG. 3 is a flow chart of controlling the switching component of the wireless charging device according to an embodiment of the present disclosure. As shown in FIG. 3, the control process includes step S11: initialization; step S12: determining whether the sensing signal of one of the plurality of infrared sensors has a preset potential; when the determination result of step S12 is "no", executing step S11 and the steps following step S11 again; when the determination result of step S12 is "yes", executing step S13: determining which of the plurality of infrared sensors has the sensing signal with the preset potential; when the determination result of step S13 is the first condition C1, executing step S14: conducting the near-field communication chip and the near-field communication antenna of the charging module where the first infrared sensor is disposed; and when the determination result of step S13 is the second condition C2, executing step S15: conducting the near-field communication chip and the near-field communication antenna of the charging module where the second infrared sensor is disposed. The above-mentioned steps are applicable to the wireless charging device 1 shown in FIG. 1, and each step will be described in detail below based on the operation of the wireless charging device 1.

In steps S11 and S12, the microcontroller 151 performs initialization and determines whether the sensing signal of one of the infrared sensors 13_1 and 13_2 has the preset potential. Specifically, when the determination result of step S12 is that the sensing signal of one of the infrared sensors 13_1 and 13_2 has the preset potential, step S13 is executed. When the determination result of step S12 is that there is no sensing signal of the infrared sensors 13_1 and 13_2 has the preset potential, step S11 and the subsequent steps of step S11 are performed again.

In step S13, the microcontroller 151 determines which of the infrared sensors 13_1 and 13_2 has the sensing signal with the preset potential. Specifically, when the determination result of step S13 is that the sensing signal of the infrared sensor 13_1 has the preset potential (referred to as "first condition C1"), step S14 is executed. When the determination result of step S13 is that the sensing signal of the infrared sensor 13_2 has the preset potential (referred to as "second condition C2"), step S15 is executed. Furthermore, when the determination result of step S13 is that the sensing signals of both infrared sensors 13_1 and 13_2 have the preset potential, a preset sequence may be to first perform step S14 and then perform step S15.

In step S14, the switching component 14 conducts the near-field communication chip 11 and the near-field communication antenna 121_1 of the charging module 12_1 where the first infrared sensor 13_1 is disposed. Specifically, after the switching component 14 conducts the near-field communication chip 11 and the near-field communication antenna 121_1, the near-field communication chip 11 may perform wireless communication through the near-field communication antenna 121_1.

In step S15, the switching component 14 conducts the near-field communication chip 11 and the near-field communication antenna 121_2 of the charging module 12_2 where the first infrared sensor 13_2 is disposed. Specifically, after the switching component 14 conducts the near-field communication chip 11 and the near-field communication antenna 1212, the near-field communication chip 11 may perform wireless communication through the near-field communication antenna 121_2.

In particular, the above-mentioned step S12 is optionally executed. In one embodiment, after step S11 is executed, step S13 and subsequent steps may be executed directly.

Figure 4:
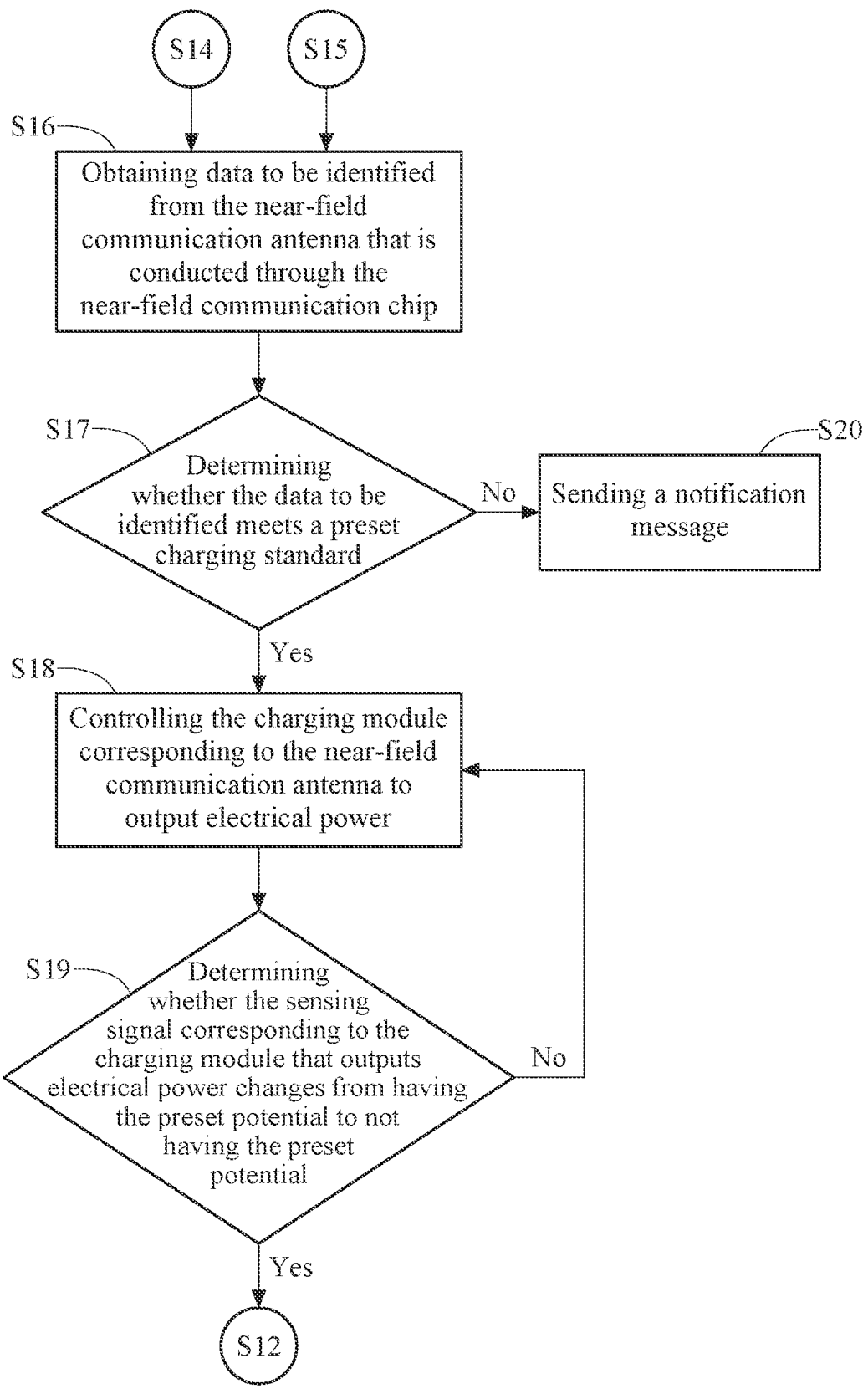
FIG. 4 is a flow chart of controlling the charging module of the wireless charging device according to an embodiment of the present disclosure.

Please refer to FIG. 4 along with FIG. 1, wherein FIG. 4 is a flow chart of controlling the charging module of the wireless charging device according to an embodiment of the present disclosure. In this embodiment, in addition to steps S11 to S15 of controlling the switching component as shown in FIG. 3, the control flow of the wireless charging device may further include, as shown in FIG. 4, step S16: obtaining data to be identified from the near-field communication antenna that is conducted through the near-field communication chip; step S17: determining whether the data to be identified meets a preset charging standard; when the determination result in step S17 is "yes", executing step S18: controlling the charging module corresponding to the near-field communication antenna to output electrical power; when the determination result in step S17 is "no", executing step S20: sending a notification message; step S19: determining whether the sensing signal corresponding to the charging module that outputs electrical power changes from having the preset potential to not having the preset potential; when the determination result of step S19 is "yes", executing step S12 and the steps following step S12 again; and when the determination result of step S19 is "no", continuing to execute step S18. The above-mentioned steps are applicable to the wireless charging device 1 shown in FIG. 1, and each step will be described in detail below based on the operation of the wireless charging device 1.

In step S16, the microcontroller 151 obtains the data to be identified from the near-field communication antenna 121_1 or/and 121_2 that is/are conducted through the near-field communication chip 11. Specifically, after step S14 of conducting the near-field communication chip 11 and the near-field communication antenna 121_1 of the charging module 12_1 where the first infrared sensor 13_1 is disposed, and step S15 of conducting the near-field communication chip 11 and the near-field communication antenna 121_2 of the charging module 12_2 where the second infrared sensor 13_2 is disposed, the microcontroller 151 may obtain the data to be identified wirelessly transmitted from the near-field communication antenna 121_1 or/and 121_2 that is/are conducted through the near-field communication chip 11.

In step S17, the microcontroller 151 determines whether the data to be identified meets the preset charging standard. Specifically, when the determination result of step S17 is that the data to be identified meets the preset charging standard, step S18 is executed. When the determination result of step S17 is that the data to be identified does not meet the preset charging standard, step S20 is executed. Furthermore, the preset charging standard may be an interconnection standard for power transmission, such as power transmission efficiency and wireless charging power. For example, when the data to be identified is that 70% of power transmission efficiency and 5 watts (W) of wireless charging power may be received, it meets the preset charging standard.

In step S18, the microcontroller 151 controls the charging module 12_1 corresponding to the conducted near-field communication antenna 121_1 or/and the charging module 12_2 corresponding to the conducted near-field communication antenna 121_2 to output electrical power through the wireless charging controller 152. Specifically, when the microcontroller 151 determines that the data to be identified transmitted by the object placed on the charging module 12_1 or/and the charging module 12_2 meets the preset charging standard, the charging controller 152 may control the charging module 12_1 or/and the charging module 12_2 on which the object is placed to output electrical power. More specifically, the near-field communication antenna 121_1 or/and 121_2 that is/are conducted may transmit the power information of the object to be charged to the microcontroller 151 through the Qi protocol, and the microcontroller 151 generates the charging frequency, the charging wattage, and other control parameters accordingly, and controls the corresponding charging module 12_1 or/and 12_2 to output electrical power through the charging controller 152. In addition, during the process of the charging module 12_1 or/and 12_2 outputting electrical power, the microcontroller 151 may also execute a foreign object detection (FOD) process.

In step S19, the microcontroller 151 determines whether the sensing signal corresponding to the charging module 12_1 or/and 12_2 that outputs electrical power changes from having the preset potential to not having the preset potential. Specifically, when the determination result of step S19 is that the sensing signal corresponding to the charging module 12_1 or/and 12_2 that outputs electrical power changes from having the preset potential to not having the preset potential, step S12 is executed. When the determination result of step S19 is that there is no sensing signal corresponding to the charging module 12_1 or/and 12_2 that outputs electrical power changes from having the preset potential to not having the preset potential, step S18 is then executed. Furthermore, when the determination result of step S19 is that the sensing signal corresponding to the charging module 12_1 or/and 12_2 that outputs electrical power changes from having the preset potential to not having the preset potential, the charging controller 152 may control the charging module 12_1 or/and 12_2 that outputs electrical power to stop outputting electrical power.

In step S20, the microcontroller 151 may send a notification message through an output component. Specifically, the output component is connected to the microcontroller 151 to be controlled by the microcontroller 151 to send out the notification message. For example, the output component may be an output component such as a prompt light, a display, or a speaker device, or may be a wired or wireless communication port.

It should be noted that the first embodiment described above, as an example, uses two sets of charging modules and infrared sensors. However, in other embodiments, the wireless charging device may include more sets of charging modules and infrared sensors.

Figure 5:
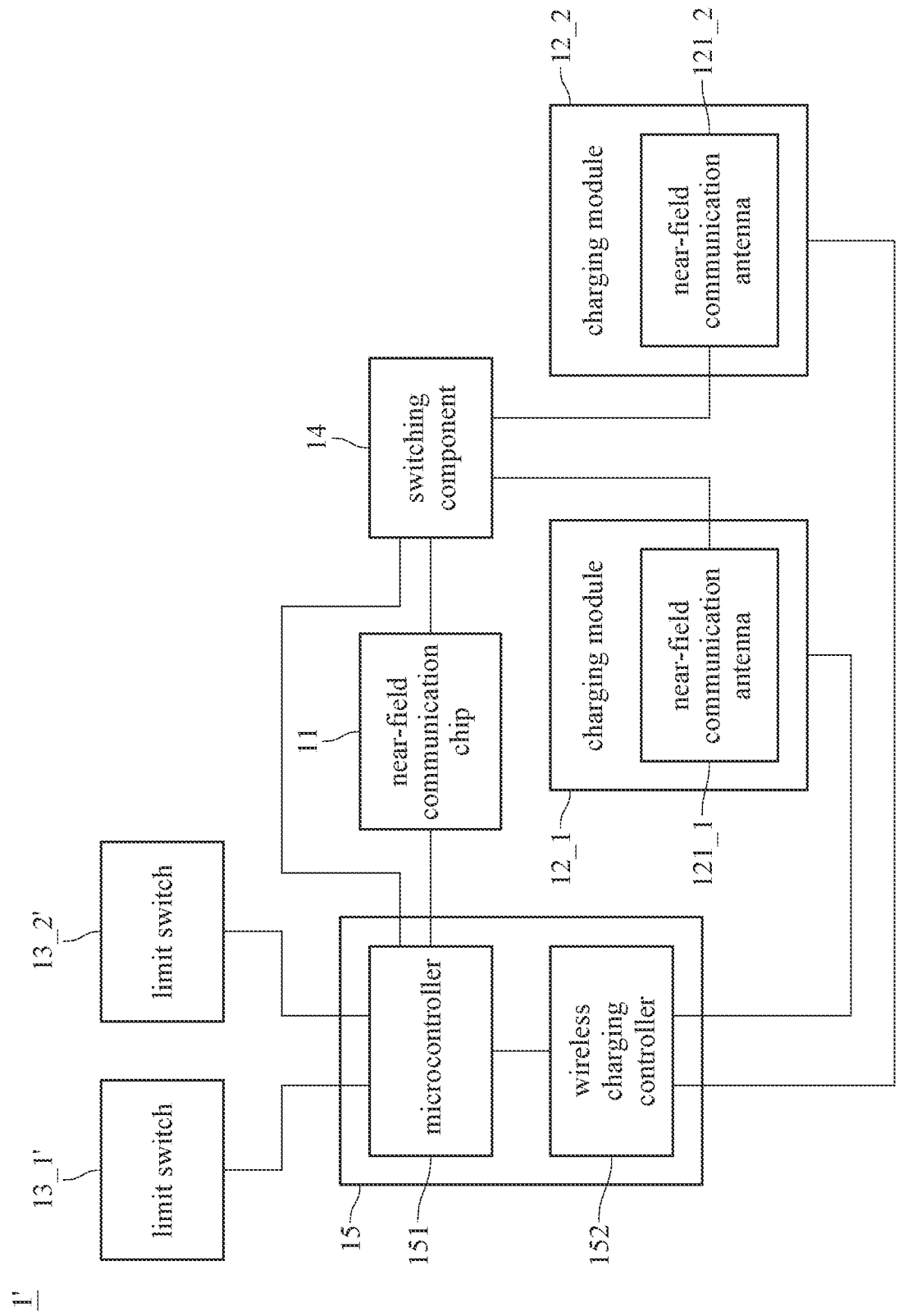
FIG. 5 is a functional block diagram of a wireless charging device according to another embodiment of the present disclosure.

The embodiment described above uses infrared sensors as an example. However, in other embodiments, the infrared sensors may also be replaced by limit switches. Please refer to FIG. 5 which is a functional block diagram of a wireless charging device according to another embodiment of the present disclosure. The components with the same reference numerals included in the wireless charging device 1' shown in FIG. 5 and the wireless charging device 1 shown in FIG. 1 may have the same functions and operations, or/and may be implemented with the same elements, and the components may have the same connection relationship. The limit switches 13_1' and 13_2' of the wireless charging device 1' shown in FIG. 5 are respectively disposed in the charging modules 12_1 and 12_2, and are configured to provide detection potential indicating whether there are objects placed on the charging modules 12_1 and 12_2.

For example, the limit switches 13_1' and 13_2' may be double-action roller limit switches. Specifically, the braking plate of the limit switch 13_1'/13_2' may be exposed to the base through the charging area corresponding to the charging module 12_1/12_2. When the limit switch 13_1'/13_2' is triggered by an object placed on the charging area corresponding to the charging module 12_1/12_2, the detection potential of the limit switches 13_1'/13_2' may have a preset potential value. That is, the preset potential value indicates that an object is placed on the charging area corresponding to the charging module 12_1/12_2. The preset potential value may be set according to the voltage received by the terminal point connected between the limit switch 13_1'/13_2' and the control module 15 or/and the common point of the limit switch 13_1'/13_2', which is not limited by the present disclosure.

Specifically, the operation performed by the control module 15 when the limit switches 13_1'/13_2' has detection potential with the preset potential value is equivalent to the operation performed by the control module 15 shown in FIG. 1 when the infrared sensor 13_1/13_2 has a sensing signal with the preset potential.

It should be noted that, the second embodiment described above exemplifies two sets of charging modules and limit switches. However, in other embodiments, the wireless charging device may include more sets of charging modules and limit switches.

In one or more embodiments of the present disclosure, the wireless charging device of the present disclosure may be applied to vehicle-mounted devices, such as self-driving cars, electric cars, semi-autonomous cars, etc.

In view of the above description, the wireless charging device of the present disclosure may use the plurality of infrared sensors disposed in the plurality of charging modules to determine whether there is an object placed on the plurality of charging modules, and use the switching component to conduct the near-field communication chip and the near-field communication antenna of the charging module on which the object is placed. Thus, compared to the wireless charging device that uses multiple near-field communication chips to conduct near-field communication antennas contained in multiple charging modules, the wireless charging device of the present disclosure may use one near-field communication chip to conduct the near-field communication antennas contained in respective one of the plurality of charging modules while maintaining the same function, thereby achieving cost reduction of near-field communication chips, layout optimization, and improving the accuracy of near-field communication determination. In addition, by adjusting the resistance values of multiple infrared sensors, the wireless charging device disclosed in one or more embodiments of the present disclosure may also obtain more accurate sensing results when the objects placed on the charging module have different materials, so that the control module may accurately determine whether the object is in the correct position among the multiple charging modules by using the sensing signals of the multiple infrared sensors to achieve precise positioning.

What is claimed is:

1. A wireless charging device for multi-module coordination using NFC communication, comprising:
   a near-field communication chip;
   a plurality of charging modules each comprising:
     a substrate;
     a near-field communication antenna disposed on the substrate; and
     a charging coil disposed at the substrate along a placement direction;
   a plurality of infrared sensors disposed at the plurality of charging modules, respectively;
   a switching component connected to the near-field communication chip and the plurality of charging modules;
   a control module connected to the near-field communication chip, the plurality of charging modules, the plurality of infrared sensors and the switching component, and configured to
   control the switching component to conduct the near-field communication chip and the near-field communication antenna of a target module among the plurality of charging modules according to a sensing signal of each of the plurality of infrared sensors;
   obtain a data from the near-field communication antenna that is conducted through the near-field communication chip;
   determine whether a preset charging standard is met based on the data;
   control the target module to output electrical power when determining that the data meets the preset charging standard; and
   wherein a projection of the charging coil along the placement direction does not overlap with a plurality of infrared sensors disposed on the charging modules.

2. The wireless charging device for multi-module coordination using NFC communication of claim 1, wherein the control module is configured to use one of the plurality of charging modules that has the sensing signal with a preset potential as the target module.

3. The wireless charging device for multi-module coordination using NFC communication of claim 1, wherein when at least two infrared sensors among the plurality of infrared sensors each has the sensing signal with a preset potential, the control module is configured to control the switching component to conduct the near-field communication chip and, among the plurality of charging modules, at least two charging modules where the at least two infrared sensors are disposed, in a preset sequence.

4. The wireless charging device for multi-module coordination using NFC communication of claim 1, further comprising:
   an output component connected to the control module,
   wherein the control module is further configured to send a notification message through the output component when determining that the data does not meet the preset charging standard.

5. The wireless charging device for multi-module coordination using NFC communication of claim 1, wherein the control module is further configured to control the target module to stop outputting electrical power when the sensing signal corresponding to the target module changes from having a preset potential to not having the preset potential.

6. The wireless charging device for multi-module coordination using NFC communication of claim 1
   wherein the near-field communication antenna is disposed at the substrate along the placement direction, and a projection of the near-field communication antenna along the placement direction not overlapping the plurality of infrared sensors.

7. The wireless charging device for multi-module coordination using NFC communication of claim 1, wherein each of the plurality of infrared sensors is a reflective photointerrupter and comprises a variable resistor.

8. The wireless charging device for multi-module coordination using NFC communication of claim 1, wherein the switching component is a radio-frequency switching component.

9. A wireless charging device for multi-module coordination using NFC communication, comprising:
   a near-field communication chip;
   a plurality of charging modules each comprising:
     a substrate;
     a near-field communication antenna disposed at the substrate; and
     a charging coil disposed at the substrate along a placement direction;
   a plurality of limit switches disposed at the plurality of charging modules, respectively;
   a switching component connected to the near-field communication chip and the plurality of charging modules;
   a control module connected to the near-field communication chip, the plurality of charging modules, a plurality of infrared sensors and the switching component, and configured to
   control the switching component to conduct the near-field communication chip and the near-field communication antenna of a target module among the plurality of charging modules according to detection potential of each of the plurality of limit switches;
   obtain a data from the near-field communication antenna that is conducted through the near-field communication chip;
   determine whether a preset charging standard is met based on the data;
   control the target module to output electrical power when determining that the data meets the preset charging standard; and
   wherein a projection of the charging coil along the placement direction does not overlap with a plurality of infrared sensors disposed on the charging modules.

10. The wireless charging device for multi-module coordination using NFC communication of claim 9, wherein the control module is configured to use one of the plurality of charging modules that has the detection potential with a preset potential as the target module.

11. The wireless charging device for multi-module coordination using NFC communication of claim 9, wherein when at least two limit switches among the plurality of limit switches each has the detection potential with a preset potential, the control module is configured to control the switching component to conduct the near-field communication chip and, among the plurality of charging modules, at least two charging modules where the at least two limit switches are disposed, in a preset sequence.

12. The wireless charging device for multi-module coordination using NFC communication of claim 9, further comprising:
   an output component connected to the control module,
   wherein the control module is further configured to send a notification message through the output component when determining that the data does not meet the preset charging standard.

13. The wireless charging device for multi-module coordination using NFC communication of claim 9, wherein the control module is further configured to control the target module to stop outputting electrical power when the detection potential corresponding to the target module changes from having a preset potential to not having the preset potential.

14. The wireless charging device for multi-module coordination using NFC communication of claim 9,
   wherein the near-field communication antenna is disposed at the substrate along the placement direction, and a projection of the near-field communication antenna along the placement direction not overlapping the plurality of limit switches.

15. The wireless charging device for multi-module coordination using NFC communication of claim 9, wherein each of the plurality of limit switches is a double-action roller limit switch.

16. The wireless charging device for multi-module coordination using NFC communication of claim 9, wherein the switching component is a radio-frequency switching component.

* * * * *